UNITED STATES PATENT OFFICE.

PERCY ALBERT BOECK, OF WORCESTER, MASSACHUSETTS, ASSIGNOR TO NORTON COMPANY, OF WORCESTER, MASSACHUSETTS, A CORPORATION OF MASSACHUSETTS.

POROUS ARTICLE.

1,081,573.   Specification of Letters Patent.   Patented Dec. 16, 1913.

No Drawing.   Application filed May 29, 1912.   Serial No. 700,398.

*To all whom it may concern:*

Be it known that I, PERCY A. BOECK, a citizen of the United States, residing at Worcester, in the county of Worcester and State of Massachusetts, have invented certain new and useful Improvements in Porous Articles, of which the following is a specification.

This invention relates to thin-walled porous articles consisting essentially of previously molten alumina, or of other highly refractory material such as corundum or carborundum, in conjunction with a ceramic bond, in proper proportions to yield an article which is permeable to liquids and gases, and hence adapted for use as filters, electrolytic diaphragms, and for other purposes. For example, articles in accordance with this invention may be made as follows: Calcined bauxite or other impure commercial form of alumina, or pure or purified alumina prepared by chemical methods, is fused in an electric furnace, and the product is crushed to grain and graded, in the known manner as practiced for the manufacture of abrasive articles. This product is hereinafter referred to as "alumina grain." The grains are preferably then roasted in an oxidizing atmosphere in order to eliminate traces of carbids or other reduction products, which if present in the finished article, might cause local disintegration or pitting of the body. The grain is then mixed with a small proportion, usually from five to fifteen per cent., or somewhat more, of a plastic clay, which serves as a bond, and sufficient water to produce a thin slip or body of suitable consistency to form the article. The slip is then applied as a comparatively thin layer to the surface of a suitable mold or form, which should be highly absorptive in character. Plaster of Paris is suitable for the preparation of such molds or forms. The mold with the applied refractory coating is then dried at moderate temperatures, say about 50° C., after which the article may be separated from the mold and will be found sufficiently strong to endure firing. The molds or forms may be used an indefinite number of times. The firing is accomplished in kilns under standard conditions and at temperatures sufficiently high to fuse, vitrify or in some instances to partially vitrify the bond, as may be required by porosity or other characteristics desired in the body.

By the use of small proportions of a clay or other ceramic bond, as above described, a double result is secured; for the articles may be made highly porous, possessing a remarkably high filtering capacity per unit area; and they retain in a large measure the refractory character and chemical inertness of the alumina grain.

Crucibles made as above described may replace the so-called Gooch crucibles for analytical purposes; and are also adapted for melting metals and other materials on a laboratory or on a technical scale. They have a thermal conductivity more than one and a half times that of the best porcelain, this being of great advantage in connection with all heat processes.

Among the many articles which may be advantageously made in accordance with this invention may be mentioned extraction thimbles or vessels for use with volatile solvents; filtering tubes, cylinders or disks for portable waters; porous diaphragms in the form of sheets, cups or vessels for electrolytic purposes; and the like. Such articles may be porous over their entire surface, or portions thereof may be glazed, as for example the marginal portions of the crucibles and extraction thimbles, the ends of the tubes or cylinders, etc.

The degree of porosity of the articles may be varied within certain limits by varying the proportion of the clay bond, the highest porosity as well as the most refractory article being secured by using the minimum proportion of a highly plastic clay. The porosity may also be controlled within certain limits by varying the size of the grain. When alumina is used, grains between 46 and 220 mesh have been found best suited for general purposes.

It will be noted that the materials referred to as suitable for use in the manufacture of articles of the kind above referred to, are all such as have in the course of their production, been subjected to very high temperatures, of the degree available only in electric furnaces, and the term "highly refractory" is intended to characterize such materials.

I claim:

1. A thin-walled porous article adapted for use as a filter and consisting essentially of alumina grain in conjunction with a small proportion of a ceramic bond.

2. A thin-walled porous article adapted for use as a filter and consisting essentially of grains of a highly-refractory material in conjunction with a small proportion of a ceramic bond.

In testimony whereof, I affix my signature in presence of two witnesses.

PERCY ALBERT BOECK.

Witnesses:
CHAS. R. MILLER,
H. O. ANDERSON.